Patented May 6, 1952

2,595,596

UNITED STATES PATENT OFFICE 2,595,596

STEROID 20-21 ENOL ACETATES

Robert Bruce Moffett, Kalamazoo, Mich., assignor to The Upjohn Company, Kalamazoo, Mich., a corporation of Michigan No Drawing. Application January 25, 1951,
Serial No. 207,829

17 Claims. (Cl. 260—239.55)

This invention relates to a method for the preparation of steroid enol acetates having the carbon skeleton

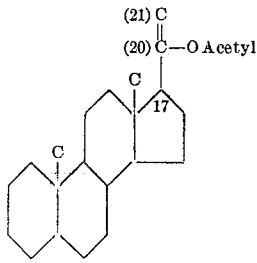

from steroid 20-ketones having the carbon skeleton

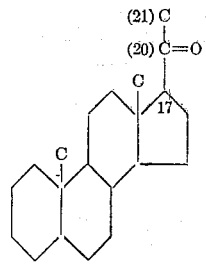

wherein the sole substituent other than carbon attached to carbon atoms 17 and 21 is hydrogen and to the 20–21 enol acetates prepared thereby.

The products of this invention are crystalline solids which are insoluble in water and moderately soluble in most common organic solvents. They can be readily differentiated from other steroid enol acetates by the presence in their infrared absorption spectra of a strong absorption band at about 1666 cm.$^{-1}$. This absorption band is not shown by those steroid enol acetates that do not have a terminal methylene group attached to the carbon carrying the —O-acetyl group. The products of this invention are particularly useful as intermediates in the synthesis of physiologically active substances.

The method of this invention, by which 20-ketosteroids of the class described are converted to their corresponding delta 20,21-enol acetates, is carried out by heating to distillation temperatures a mixture of the 20-ketosteroid and isopropenyl acetate in the presence of catalytic amount of a suitable acid and removing from the reaction zone the acetone formed as a reaction product substantially as rapidly as it is formed. The reaction proceeds essentially according to the following equation:

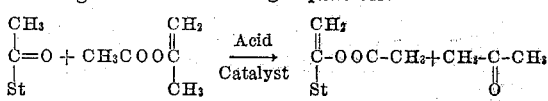

wherein St represents a cyclopentanoperhydrophenanthrene nucleus attached to the two carbon side chain at the 17-position. The duration of the heating period varies with each individual steroid, with periods of up to about eight to ten hours being usually sufficient. The completion of the reaction, when an efficient column is used to separate the lower boiling acetone from isopropenyl acetate, is indicated by the approach of the distillation temperature to that of isopropenyl acetate.

When the reaction is complete the product can be isolated by neutralizing the acid catalyst with solid alkali, such as sodium bicarbonate, sodium carbonate and the like; removing the unreacted isopropenyl acetate by distillation under reduced pressure; adding cold water to the residue and extracting with a suitable solvent such as methylene dichloride, ethylene dichloride and the like. After washing the solvent solution, drying it and removing the solvent by distillation the enol acetate can be crystallized from the residue using a suitable solvent such as methanol, acetone or solvent mixtures such as methanol and methylene dichloride, methanol and methyl ethyl ketone and acetone and isopropyl ether.

Acids which are suitable for use in catalyzing the reaction are those substantially non-volatile, non-oxidizing water free acids such as sulfuric acid and the alkyl, aryl and aralkyl sulfonic acids with p-toluenesulfonic acid being preferred because of its ready availability and ease in handling.

Among the 20-ketosteroids which can be used in the method of this invention are the various sterioisomeric modifications such as the normal and allo-isomers of the 20-ketopregnans, 20-ketopregnens, 20-ketopregnadiens, and 20-ketopregnatriens which have no substituent other than hydrogen on carbon atoms 17 and 21. Substituents other than hydrogen can be present elsewhere in the steroid molecule without preventing for formation of the 20–21 enol acetates. Among substituents or groups which can be present are halogen, hydroxyl, epoxy, alkoxyl, aralkoxyl, acyloxy, carboxyl, carboalkoxy carbonyl and adducts with maleic anhydride, maleic acid and esters of maleic acid. These substituents may be located on any position in the steroid skeleton, other than the 17 and 21-position, with the most important starting 20-ketones being those having aditional substituents on one or more positions 3, 5, 8, 9, 11 and 12. When the nuclear substituent is a double bonded oxygen (ketone) this additional ketone group may form an enol acetate as does the 20-keto group. Whether or not this acetylation will take place will depend upon the location of the ketone group and its ability to enolize. Among the 20 ketosteroids that are suitable for use in the method of this invention are pregnen-4-dione-3,20 (progesterone); 11(alpha)-hydroxypregnen-4-dione-3,20; 11(alpha)-acetoxypregnen-4-dione-3,20; pregnen-3,11,20-trione; 12-acetoxy-pregnen-4-dione-3,20; 12-hydroxypregnen-4-one-20; 3-acetoxypregnadien-5,16-one-20; 3-acetoxyallopregnanone-20; pregnandione-3,20; 5-chloropregnanone-20; 3,7,12-triacetoxypregnanone-20; 3,7,12-trihydroxypregnan-20-one; 3-chloropregnanone-20; 3(alpha)-hydroxyallopregnanone-20; allopregnandione - 3,20; 3,12-diacetoxypregnanone-20; 3-acetoxy-16-allopregnenone-20 and the like.

The 3-hydroxy or 3-acyloxy-5,7,9(11)-pregnatrien-20-one adducts having the formula:

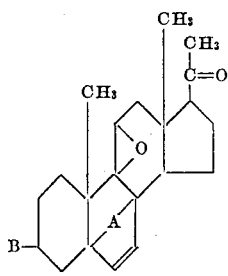

wherein B is hydroxy or acyloxy and A is an adduct radical of a dienophile selected from the group consisting of maleic acid, maleic anhydride and maleic acid dialkyl esters, which are among the materials suitable for use in the method of this invention, can be prepared by the oxidation of the 3-hydroxy- or 3-acyloxy-5,7,9(11)-pregnatrien-20-one adduct using peracid or concentrated hydrogen peroxide as the oxidant. Peracids which may be used are peracetic acid, perbenzoic acid, monoperphthalic acid and the like. The starting 3-hydroxy- or 3-acyloxy-5,7,9(11)-pregnatrien-20-one adducts, which are likewise among the materials suitable for use in the method of this invention have the formula:

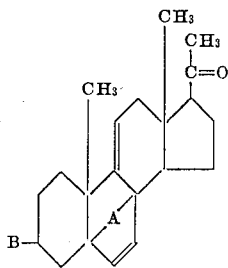

wherein A and B have the values given.

The 3-acyloxy-5,7,9(11)-pregnatrien-20-one adducts are conveniently prepared by the selective oxidation of an enol ester of an adduct of 3-acyloxybisnor-5,7,9(11)-cholatrien-22-al, represented by the formula:

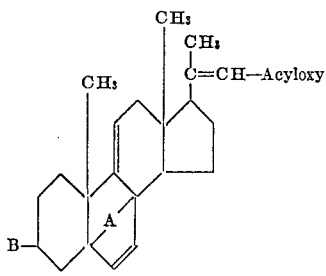

wherein A and B have the values previously given, B in this case excluding the free hydroxyl group.

Adducts of 3,22 - diacyloxybisnor - 5,7,9(11),-20(22)-cholatetraenes are conveniently prepared by subjecting an adduct of a 3-acyloxybisnor-5,7,9(11)-cholatrien-22-al having the formula:

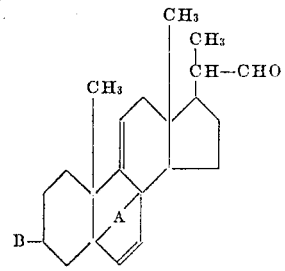

wherein A and B have the values previously given to the action of an acid anhydride or acid halide in the presence of an alkaline salt of the acid.

The 3-acyloxy-5,7,9(11)-pregnatrien-20-ones having the formula:

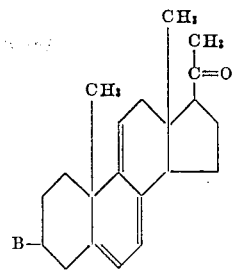

wherein B has the values already given can be prepared by decomposition of its maleic acid or maleic anhydride adduct in the presence of a secondary or tertiary amine.

The following examples and preparations are illustrative of the products and process of the present invention but are not to be construed as limiting.

PREPARATION 1.—MALEIC ANHYDRIDE ADDUCT OF 3-BETA - ACETOXY - 22 - ACETOXYBISNOR - 5,7,9(11),20-(22)-CHOLATETRAENE

A mixture of twenty grams of the maleic anhydride adduct of 3-beta-acetoxybisnor-5,7,9-(11)-cholatrien-22-al, six grams of anhydrous sodium acetate, and 600 milliliters of acetic anhydride, was heated under reflux for six hours, whereafter volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3-beta-acetoxy - 22 - acetoxy - bisnor - 5,7,9(11),20(22)-cholatetraene, which melted at 186 to 193 degrees centigrade. Recrystallization of the crude product from a mixture of acetone and pentane raised the melting point to 200.5 to 202 degrees centigrade.

PREPARATION 2

In a manner essentially that described in Preparation 1, the following compounds were prepared:

(1) The dimethyl maleate adduct of 3-beta-benzoyloxy - 22 - acetoxybisnor-5,7,9(11),20(22)-cholatetraene, which melted at 210 to 211 degrees centigrade.

(2) The dimethyl maleate adduct of 3-beta-acetoxy - 22 - acetoxybisnor - 5,7,9(11),20(22)-cholatetraene, which melted at 181 to 183 degrees centigrade.

In the same manner as given above, 22-acyloxy, e. g., formoxy, acetoxy, propionoxy, butyroxy, valeroxy, hexanoyloxy, heptanoyloxy, octanoyloxy, benzoyloxy, naphthoyloxy, and the like 3 - acyloxybisnor - 5,7,9(11),20(22) -cholatetraene adducts, are obtained from the compounds such as 3 - formoxy - 22 - acetoxybisnor - 5,7,9(11),-20(22)-cholatetraene, 3-propionoxy-22-acetoxybisnor - 5,7,9(11),20(22) - cholatetraene, 3,22-dipropionoxybisnor - 5,7,9(11),20(22) - cholatetraene, 3,22 - dibenzoyloxybisnor - 5,7,9(11),-20(22)-cholatetraene, and 3-heptanoyloxy-22-octanoyloxybisnor - 5,7,9(11),20(22) - cholatetraene adducts with maleic anhydride or maleic acid esters such as the dimethyl maleate, diethyl maleate, dipropyl maleate, diisopropyl maleate, dibutyl maleate, dioctyl maleate, dibenzyl maleate, and the like.

PREPARATION 3.—MALEIC ANHYDRIDE ADDUCT OF 3-BETA-ACETOXY-5,7,9(11)-PREGNATRIEN-20-ONE

A solution of 5.08 grams of the maleic anhydride adduct of 3-beta-acetoxybisnor-5,7,9(11)-cholatrien-22-al enol acetate in 100 milliliters of methylene chloride was cooled to about minus seventy degrees centigrade and ozonized until 483 milligrams of ozone had been absorbed. Fifty milliliters of glacial acetic acid was then added and the methylene chloride removed under reduced pressure. An additional thirty milliliters of glacial acetic acid was then added and the ozonide decomposed by adding seven grams of powdered zinc at a substantially uniform rate while maintaining the reaction temperature between seventeen and twenty degrees centigrade. The mixture was stirred for an additional twenty minutes, filtered, and the zinc washed with 140 milliliters of glacial acetic acid. The organic extracts were combined and diluted with seventy milliliters of water. When crystallization commenced, the rate of precipitation was increased by addition of two volumes of water. There was thus obtained 4.0 grams of the maleic anhydride adduct of 3-beta-acetoxy-5,7,9(11)-pregnatrien-20-one, which melted at 240 to 264.5 degrees centigrade. Several recrystallizations of the crude material from acetone raised the melting point to 263.5 to 264.5 degrees centigrade.

PREPARATION 4.—MALEIC ACID ADDUCT OF 3-BETA-HYDROXY-5,7,9(11)-PREGNATRIEN-20-ONE

A solution of 4.52 grams (0.01 mole) of the maleic anhydride adduct of 3-beta-acetoxy-5,7,9(11)-pregnatrien-20-one, M. P. 263-264.5 degrees centigrade, in a mixture of 100 milliliters of 1,4-dioxane and 400 milliliters of water containing four grams (0.10 mole) of sodium hydroxide was allowed to stand at room temperature for two and one-half hours, whereupon a small quantity of plate-like crystals formed. These were dissolved by heating the mixture to seventy degrees centigrade for one-half hour. The reaction mixture was then made acid with fifty milliliters of three normal hydrochloric acid and refrigerated to give a precipitate of 3.05 grams of needle-like crystals melting at 173-177 degrees centigrade. On crystallization from a dioxane-water mixture, the compound melted at 211-215 degrees centigrade. The melting point was found to vary somewhat with the rate of heating.

Analysis:
Calculated for $C_{25}H_{32}O_6$: C, 70.07; H, 7.53
Found: C, 69.80; H, 7.47

PREPARATION 5.—DIMETHYL MALEATE OF 3-BETA-HYDROXY-5,7,9(11)-PREGNATRIEN-20-ONE

A suspension of 0.4 gram of the maleic acid adduct of 3-beta-hydroxy-5,7,9(11)-pregnatrien-20-one, in fifty milliliters of dry ether, was cooled in an ice-salt bath while a slight excess of diazomethane in methylene chloride was added over a 25 minute period with stirring. Ten minutes after addition was complete, the solution was placed on a steam bath and concentrated rapidly to dryness. The residue was crystallized from an acetone-water mixture to give 0.34 gram of the dimethyl maleate of 3-beta-hydroxy-5,7,9(11)-pregnatrien-20-one, melting at 193-195 degrees centigrade. After chromatography and recrystallization, the compound melted at 192-197 degrees centigrade.

In the same manner as given above, other dialkyl maleates, e. g., the diethyl, dipropyl, diisopropyl, dibutyl, and dioctyl maleates of 3-hydroxy-5,7,9(11)-pregnatrien-20-one are prepared from 3 - hydroxy - 5,7,9(11) - pregnatrien-20-one maleic acid adduct and the appropriate diazoalkane, or by other equivalent esterification procedure.

PREPARATION 6.—MALEIC ANHYDRIDE ADDUCT OF 3-BETA - HEPTANOYLOXY - 5,7,9(11) - PREGNATRIEN-20-ONE

The maleic anhydride adduct of 3-beta-heptanoyloxy-5,7,9(11)-pregnatrien-20-one, melting point 170-171 degrees centigrade, was prepared by refluxing the maleic acid adduct of 3-beta-hydroxy-5,7,9(11)-pregnatrien-20-one with heptylic anhydride and pyridine for a period of twenty hours, and working up the reaction product in the usual manner.

PREPARATION 7.—MALEIC ANHYDRIDE ADDUCT OF 3-BETA-HYDROXY-5,7,9(11)-PREGNATRIEN-20-ONE

Similarly, the maleic anhydride adduct of 3-beta - hydroxy - 5,7,9(11) - pregnatrien - 20 - one, melting point about 195 degrees centigrade, was prepared by refluxing the maleic acid adduct of 3 - beta - hydroxy - 5,7,9(11)-pregnatrien-20-one with Dowtherm for eight hours. The 3-hydroxy-maleic anhydride adduct is also obtained by heating the 3-hydroxy maleic acid adduct to just above its melting point, which procedure causes water to be evolved with closing of the anhydride ring.

PREPARATION 8.—DIMETHYL MALEATE OF 3-BETA-ACETOXY-5,7,9(11)-PREGNATRIEN-20-ONE

A solution of 0.15 gram of the dimethyl maleate adduct of 3-beta-hydroxy-5,7,9(11)-pregnatrien-20-one, in 2.5 milliliters of acetic anhydride and 2.5 milliliters of pyridine, was heated on the steam bath for ninety minutes, cooled to room tempertaure, and poured into ice-water. The resulting precipitate was collected by filtration and found to melt at 205-209 degrees centigrade. Recrystallization from methanol gave the dimethyl maleate of 3-beta-acetoxy-5,7,9(11)-pregnatrien-20-one, melting at 207-211 degrees centigrade.

Analysis:
Calculated for $C_{29}H_{38}O_7$: % C, 69.86, % H, 7.68
Found: % C, 69.81, % H, 7.86
69.70   7.62

By the same manner of esterification, the following C-3 esters were prepared: (1) dimethyl maleate adduct of 3-beta-formoxy-5,7,9(11)-pregnatrien-20-one, melting point 223-230 degrees centigrade, and (2) the dimethyl maleate adduct of 3-beta-benzoyloxy-5,7,9(11)-pregnatrien-20-one, melting point 250–254 degrees centigrade.

PREPARATION 9.—DIMETHYL MALEATE OF 3-BETA-ACETOXY-5,7,9(11)-PREGNATRIEN-20-ONE

A suspension of fifteen grams of 3-beta-acetoxy-5,7,9(11)-pregnatrien-20-one maleic anhydride adduct in 320 milliliters of methanol was cooled in an ice-salt bath. A boiling chip was added and the suspension treated with approximately 775 milliliters of diazomethane-methylene chloride solution in 100-milliliter portions over a period of three hours, all of the solid going into solution. At the end of this time the solution was reduced to one-half its original volume on the steam bath to remove excess diazomethane, filtered, and concentrated to about 250 milliliters. Upon cooling, crystals of the dimethyl maleate of 3-beta-acetoxy-5,7,9(11)-pregnatrien-20-one, melting at 204–208 degrees centigrade, were deposited. The yield was 13.2 grams (87 percent of theory).

In the same manner as given above, still other 5,7,9(11)-pregnatrien-20-one adducts are prepared from the corresponding 3,22-diacyloxybisnor-5,7,9(11),20(22)-cholatetraene maleic acid, maleic acid anhydride, and maleic acid diester adducts. Such compounds include the 3-formoxy-5,7,9(11)-pregnatrien-20-one maleic acid, maleic acid anhydride, dimethyl maleate, diethyl maleate, dibutyl maleate, dioctyl maleate, diisopropyl maleate, dibenzyl maleate, and like adducts; the corresponding 3-propionoxy, butyroxy, valeroxy, hexanoyloxy, heptanoyloxy, octanoyloxy, naphthoyloxy, benzoyloxy, and similar 20-ketone adducts, including, for example, 3-propionoxy-5,7,9(11)-pregnatrien-20-one dipropyl maleate, 3-benzoyloxy-5,7,9(11)-pregnatrien-20-one dibenzoyl maleate, 3-heptanoyloxy-5,7,9(11)-pregnatrien-20-one dimethyl maleate, 3-valeroyloxy-5,7,9(11)-pregnatrien-20-one maleic acid anhydride adducts, and the like.

PREPARATION 10.—DIMETHYL MALEATE ADDUCT OF 3-BETA-ACETOXY-9,11-OXIDO-5,7-PREGNADIEN-20-ONE

One gram (0.002 mole) of the dimethyl maleate adduct of 3-beta-acetoxy-5,7,9-pregnatrien-20-one was dissolved in 25 milliliters of glacial acetic acid, and a solution of one milliliter of thirty percent hydrogen peroxide (four molar equivalents) in six milliliters of glacial acetic acid was added thereto at room temperature. The reaction mixture was heated on the steam bath for four hours, and thereafter allowed to stand at room temperature overnight. The mixture was then poured into 300 milliliters of water, the resulting precipitate separated by filtration, washed with water, and dried. The yield was 810 milligrams of the oxido compound melting at 197–206 degrees centigrade. After five recrystallizations from methanol and acetone-hexane, the dimethyl maleate adduct of 3-beta-acetoxy-9,11-oxido-5,7-pregnadien-20-one melted at 216–221 degrees centigrade, $[alpha]_D^{26}+11.4$ degrees (in chloroform).

Analysis:
Calculated for $C_{29}H_{38}O_8$: % C, 67.68; % H, 7.44
Found: % C, 67.74; % H, 7.35
68.02       7.49

PREPARATION 11.—MALEIC ANHYDRIDE ADDUCT OF 3-BETA-ACETOXY-9,11-OXIDO-5,7-PREGNADIEN-20-ONE

Five grams (0.011 mole) of the maleic anhydride adduct of 3-beta-acetoxy-5,7,9(11)-pregnatrien-20-one was dissolved in 120 milliliters of hot glacial acetic acid, the solution thereafter cooled to room temperature, and a solution of five milliliters of thirty percent hydrogen peroxide (four molar equivalents) in thirty milliliters of glacial acetic acid added dropwise thereto with swirling. The reaction mixture was heated on the steam bath for three and one-half hours. The colorless solution was allowed to stand at room temperature overnight, poured into about one liter of water, the resulting precipitate separated by filtration, washed with water, and dried in a vacuum desiccator. The yield was 4.88 grams (94.8 percent), melting at 232–246 degrees centigrade. After two recrystallizations from acetone, crystals of the maleic anhydride adduct of 3-beta-acetoxy-9,11-oxido-5,7-pregnadien-20-one, melting at 240–246 degrees centigrade, were obtained.

Analysis:
Calculated for $C_{27}H_{32}O_7$: % C, 69.21; % H, 6.89
Found: % C, 69.43; % H, 6.94
69.30       6.97

PREPARATION 12.—MALEIC ANHYDRIDE ADDUCT OF 3 BETA-ACETOXY-9,11-OXIDO-5,7-PREGNADIEN-20-ONE

A solution of fifty grams of the maleic anhydride adduct of 3-beta-acetoxy-5,7,9(11)-pregnatrien-20-one in 1200 milliliters of glacial acetic acid was prepared by heating the ingredients together on a steam bath. The mixture was then cooled below forty degrees centigrade and fifty milliliters of thirty percent hydrogen peroxide in 300 milliliters of glacial acetic acid added thereto. The mixture was then heated on the steam bath for one hour at a temperature of 85 degrees centigrade or above, and was then poured into three to five volumes of ice and water. The yield was 47.7 grams (92 percent), melting point 238–243 degrees centigrade, $[alpha]_D^{25}+31.1$ degrees in chloroform. The product was dissolved in methylene chloride and precipitated by addition of ether to give 37.7 grams of purified product having a melting point of 254 to 259 degrees centigrade, $[alpha]_D^{25}+33.2$ degrees.

PREPARATION 13

In the same manner as given above for the preparation of 3-beta-acetoxy-9,11-oxido-5,7-pregnadien-20-one maleic anhydride adduct, the following compounds were prepared:

(1) Maleic anhydride adduct of 3-benzoyloxy-9,11-oxido-5,7-pregnadien-20-one, M. P. 258–260 degrees centigrade, $[alpha]_D^{26}+24.4$ degrees (in chloroform).

Analysis:
Calculated for $C_{32}H_{34}O_7$: % C, 72.43; % H, 6.46
Found: % C, 72.62; % H, 6.42
72.70       6.38

(2) Maleic anhydride adduct of 3-heptanoyloxy-9,11-oxido-5,7-pregnadien-20-one, M. P. 168–169.5 degrees centigrade, $[alpha]_D^{26}+26.1$ degrees (in chloroform).

Analysis:
Calculated for $C_{32}H_{41}O_7$: % C, 71.48; % H, 7.69
Found: % C, 71.27; % H, 7.43
71.44       7.65

PREPARATION 14.—MALEIC ACID ADDUCT OF 3-BETA-HYDROXY-9,11-OXIDO-5,7-PREGNADIEN-20-ONE

Approximately 445 milliliters of five percent sodium hydroxide solution was added to 22.26 grams of 3-beta-acetoxy-9,11-oxido-5,7-pregnadien-20-one maleic anhydride adduct in a one-liter Erlenmeyer flask, and the mixture stirred until the solid had gone into solution. About 185 milliliters of ten percent hydrochloric acid was then added at room temperature or below, until the mixture was acid to Congo red paper, whereupon the hydroxy diacid began to precipitate. Upon cooling the flask overnight, filtering and air-drying the product at room temperature, a yield of 19.4 grams of desired 3-beta-hydroxy-9,11-oxido-5,7-pregnadien-20-one maleic acid adduct, melting at 229–233 degrees centigrade with decomposition, was obtained. An additional crop of crystals was obtained by concentration of the mother liquor.

The same product is obtained by epoxidation of the 9,11 double bond of 3-beta-hydroxy-5,7,9(11)-pregnatrien-20-one maleic acid adduct with hydrogen peroxide in the manner of the preceding preparations, using a glacial acetic acid medium.

PREPARATION 15.—MALEIC ANHYDRIDE ADDUCT OF 3-BETA-HYDROXY-9,11-OXIDO-5,7-PREGNADIEN-20-ONE

3 - beta - hydroxy - 9,11-oxido-5,7-pregnadien-20-one maleic acid adduct (19.4 grams) was placed in a vacuum oven and heated for ten hours at 137–140 degrees centigrade under a pressure of only one-half millimeter of mercury. The yield of desired anhydride, which melts at 233 to 240 degrees centigrade with decomposition, was quantitative.

The same product is obtained by epoxidation of the 9,11 double bond of 3-beta-hydroxy-5,7,9(11)-pregnatrien-20-one maleic anhydride adduct with hydrogen peroxide in the manner of the preceding preparations, using a glacial acetic acid medium.

PREPARATION 16.—MONOMETHYL MALEATE OF 3-BETA-HYDROXY-9,11-OXIDO-5,7-PREGNADIEN-20-ONE

A solution of five grams of the maleic anhydride adduct of 3-beta-acetoxy-9,11-oxido-5,7-pregnadien-20-one in 145 milliliters of methanol and a solution of five grams of sodium hydroxide in 25 milliliters of water were mixed and the mixture allowed to stand for one hour, whereafter 145 milliliters of water was added, the mixture allowed to stand for seven hours, then made acid with three normal hydrochloric acid and placed in the refrigerator. The mixture was then extracted with methylene chloride, washed with sodium chloride, and dried over sodium sulfate. The yield was 4.93 grams, melting point 130–160 degrees centigrade. After recrystallization three times from a solution of chloroform, methanol, and ether, the melting point was 193–198 degrees centigrade, $[alpha]_D^{25} + 19.4$ degrees (chloroform).

Analysis:
Calculated for $C_{26}H_{34}O_7$: % C, 68.10; % H, 7.47; % $OCH_3$, 6.76
Found: % C, 67.90; % H, 7.14; % $OCH_3$, 6.22
            67.97        7.35              6.12

The same product is obtained by epoxidation of the 9,11 double bond of 3-beta-hydroxy-5,7,9(11)-pregnatrien-20-one monomethyl maleate with hydrogen peroxide according to the manner of the preceding preparations.

PREPARATION 17.—DIMETHYL MALEATE OF 3-BETA-HYDROXY-9,11-OXIDO-5,7-PREGNADIEN-20-ONE

A suspension of 0.65 gram of the monomethyl ester of the maleic acid adduct of 3-beta-hydroxy-9,11-oxido-5,7-pregnadien-20-one in twenty milliliters of anhydrous ether was treated with an excess of diazomethane in methylene chloride solution. On addition of methylene chloride the compound went in solution, and was allowed to stand about two hours, the solution evaporated to dryness, and the residue dissolved in twelve milliliters of hot ethanol, filtered, concentrated, water added, and the solution placed in the refrigerator. The precipitate was separated by filtration, to give a yield of 0.54 gram, melting at 207–211 degrees centigrade. The product was passed over a column of alumina for purification, and this procedure yielded 0.50 gram of product, which upon crystallization from methanol had a melting point of 210–212 degrees centigrade, $[alpha]_D^{26} + 15.4$ degrees (chloroform).

Analysis:
Calculated for $C_{27}H_{36}O_7$: % C, 68.62; % H, 7.68; % $OCH_3$, 13.13
Found: % C, 68.62; % H, 7.61; % $OCH_3$, 12.10
            68.61        7.64              12.22

Infrared analysis was in agreement with the structure proposed.

PREPARATION 18.—3-BETA-ACETOXY-5,7,9(11)-PREGNATRIEN-20-ONE

Two grams (2.0 grams) of the maleic anhydride adduct of 3-beta-acetoxy-5,7,9(11)-pregnatrien-20-one, melting point 258–262 degrees centigrade, was dissolved in eighteen milliliters of dimethyl aniline and heated under reflux in an atmosphere of nitrogen for four and one-half hours. The dimethyl aniline was distilled in vacuo and the residue chromatographed over alumina to give 1.5 grams (94 percent) of maleic anhydride-free material. Crystallization from methanol gave one gram (66 percent) of 3-beta-acetoxy-5,7,9(11)-pregnatrien-20-one, melting at 130 – 134 degrees centigrade. Recrystallization for analysis gave pure material, melting at 141–143 degrees centigrade. Ultraviolet absorption spectrum: maxima at 312.5 mu ($E=9500$), 325 mu ($E=10800$), 339 mu ($E=6700$), in 95 percent alcohol.

PREPARATION 19.—3-BETA-HYDROXY-5,7,9(11)-PREGNATRIEN-20-ONE

A mixture of 1.3 grams of 3-beta-acetoxy-5,7,9-(11)-pregnatrien-20-one, 1.03 grams of potassium carbonate, fifteen milliliters of water, and sixty milliliters of methanol was allowed to stand at room temperature for twelve hours and then poured into 500 milliliters of water to obtain 0.61 gram of 3-beta-hydroxy-5,7,9(11) - pregnatrien-20-one, which melted at 165 to 190 degrees centigrade. Recrystallization of this crude material from methanol raised its melting point to 206.5 to 208.5 degrees centigrade.

The following examples are illustrative of the procedure of this invention and the 20-ketosteroids which can be used but is by no means an exhaustive compilation of such compounds or minor variations in procedure as will be apparent to those skilled in the art.

*Example 1.—3-beta-20-diacetoxy-5,7,9,20-pregnatetraen dimethyl maleate adduct*

Two grams of 3-beta-acetoxy-5,7,9-pregnatrien-20-one dimethyl maleate adduct, twenty milliliters of isopropenyl acetate and 0.1 gram of p-toluenesulfonic acid were placed in a reaction flask to which was attached a short fractionating column. The mixture was heated to boiling and a mixture of acetone and isopropenyl acetate distilling between 56 and 90 degrees centigrade was collected over a period of from about eight to about ten hours. The p-toluenesulfonic acid was neutralized by the addition of solid sodium bicarbonate and the excess isopropenyl acetate removed under reduced pressure. Cold water and methylene chloride was added with stirring to the residue. The methylene dichloride layer was separated, washed with water, dried over anhydrous sodium sulfate and the solvent removed.

The residue on crystallization from methanol gave 1.3 grams of 3-beta,20-diacetoxy-5,7,9,20-pregnatetraen dimethyl maleate adduct melting at 184-188 degrees centigrade. After crystallization from a mixture of methylene dichloride and methanol followed by crystallization from acetone the tetraen adduct melted at 196.5-198 degrees centigrade [alpha]$_D^{25.5}$+86.3 degrees (1.01 percent in chloroform).

Ozonization of tetraen adduct dissolved in methylene chloride gave 3-beta-acetoxy-5,7,9-etio cholatrienic acid dimethyl maleate adduct melting at 255-259 degrees centigrade.

*Example 2.—3-beta,20-diacetoxy-5,7,9:(11),20-pregnatetraen maleic anhydride adduct*

By the procedure described in Example 1, 3-beta-acetoxy-5,7,9:(11)-pregnatrien-one-20 maleic anhydride adduct, isopropenyl acetate and p-toluenesulfonic acid gave 3-beta,20-diacetoxy-5,7,9:(11),20-pregnatetraen melting at 219-220.5 degrees centigrade after crystallization from a mixture of acetone and isopropyl ether.

*Example 3.—3-beta-20-diacetoxy-5,20-pregnadien*

Two grams of 5-pregnen-3-beta-ol-20-one acetate, twenty milliliters of isopropenyl acetate and 0.1 gram of p-toluenesulfonic acid were heated under reflux with acetone removal and the reaction product was isolated as in Example 1. After crystallization from methanol and methyl ethyl ketone 3-beta-20-diacetoxy-5,20-pregnadien was obtained which melted at 122.5-123.5 degrees centigrade; [alpha]$_D^{26.5}$ minus 45.8 degrees (C=1.623 percent in chloroform).

*Example 4. — 3 - beta -20- diacetoxy-9,11-oxido-5,7,20-pregnatrien maleic anhydride adduct*

In a manner similar to that of Example 1, 3-beta-acetoxy- 9,11 -oxido-5,7-pregnadien-20-one maleic anhydride adduct, isopropenyl acetate and p-toluenesulfonic acid gave 3-beta-20-diacetoxy-9,11-oxido-5,7,20-pregnatrien maleic anhydride adduct which melted at 245-249 degrees centigrade after crystallization from acetone and had an optical rotation [alpha]$_D$, when determined in a 1.03 percent chloroform solution, of plus 14.2 degrees.

*Example 5.—3-beta-20-diacetoxy-9,11-oxido-5,7,20-pregnatrien-dimethyl maleate adduct*

In a manner similar to that of Example 1, 3-beta - acetoxy-9,11-oxido-5,7-pregnadien-20-one dimethyl maleate adduct, isopropenyl acetate and p-toluenesulfonic acid gave 3-beta-20-diacetoxy-9,11-oxido-5,7,20-pregnatrien dimethyl maleate adduct melting at 213-215 degrees centigrade.

*Example 6.—3-beta-20-diacetoxy-20-allopregnen*

A mixture of 6.91 grams of allopregnanolone acetate, 0.1 gram of p-toluenesulfonic acid and thirty milliliters of isopropenyl acetate were heated under reflux in a reaction pot to which was attached a short fractionating column. A mixture of acetone and isopropenyl acetate distilling between 56 and 85 degrees centigrade amounting to about fifteen milliliters was collected over a period of about ten hours. The resulting brown solution was diluted by the addition of thirty milliliters of methylene dichloride, ice was added and the mixture washed to alkalinity with cold five percent sodium hydroxide solution and cold ten percent sodium bicarbonate solution. The methylene dichloride solution was washed until about neutral with water and then dried over anhydrous sodium sulfate. The solvent was removed and the residue crystallized from methanol. There was thus obtained 2.7 grams of 3-beta-20-diacetoxy-20-allopregnen melting at 87-88 degrees centigrade. A further 3.0 grams was obtained by concentrating the methanolic mother liquors and cooling.

*Example 7.—3-beta-20-diacetoxy-5,16,20-pregnatrien*

When treated in a manner similar to that of Example 4, 3.0 grams of 3-beta-acetoxy-5,16-pregnadien-20-one gave 2.21 grams of 3-beta-20-diacetoxy-5,16,20-pregnatrien melting at 148-149 degrees centigrade.

*Example 8.—3-beta-20-diacetoxy-5,7,9:(11),20-pregnatetren*

By the procedure of Example 1, 3-beta-acetoxy-5,7,9:(11)-pregnatrien-one-20, isopropenyl acetate and p-toluenesulfonic acid gave 3-beta-20-diacetoxy - 5,7,9:(11),20 - pregnatetren which melted at 163-166 degrees centigrade after crystallization from a mixture of methylene chloride and methyl alcohol and had an optical rotation [alpha]$_D^{26}$, when determined in a 1.04 percent chloroform solution, of plus 262.3 degrees.

*Example 9.—3,20-diacetoxy-3,5,20-pregnatrien*

By the procedure of Example 1 progesterone (3,20-diketo-4-pregnen), isopropenyl acetate and p-toluenesulfonic acid gave 3,20-diacetoxy-3,5,20-pregnatrien which melted at 83-87 degrees centigrade after crystallization from methanol and had an optical rotation [alpha]$_D^{24}$ when determined in a 1.293 percent chloroform solution of minus 119 degrees.

*Example 10.—3-beta,20-diacetoxy-16,20-allopregnadien*

By the procedure of Example 1 3-beta-acetoxy-16-allopregnene-20-one isopropenyl acetate and p-toluenesulfonic acid gave 3-beta,20-diacetoxy-16,20-allopregnadien which melted at 143-145 degrees centigrade after crystallization from acetone and had an optical rotation [alpha]$_D^{24}$, when determined in a 0.979 percent chloroform solution of plus 10 degrees.

Having thus decribed my invention I claim:

1. A method for the conversion of 20-ketosteroids, having hydrogen as the sole substituent attached to carbon atoms 17 and 21 of the carbon skeleton, to the corresponding 20:21 enol acetate comprising heating under reflux a 20-ketosteroid having hydrogen as the sole possible substituent attached to carbon atoms 17 and 21 of the steroid carbon skeleton and isopropenyl acetate in the presence of a catalytic amount of a sulfonic acid, whereby a steroid 20:21 enol acetate and acetone are formed as reaction products, while continuously distilling from the reaction zone the acetone as formed.

2. A method for the conversion of 20-ketosteroids having hydrogen as the sole substituent attached to carbon atoms 17 and 21 of the carbon skeleton to the corresponding 20:21 enol acetate comprising heating under reflux a member of the group consisting of 20-ketosteroids having the carbon skeleton of 20-ketopregnan, 20-ketopregnen, 20-ketopregnadien, 20-ketopregnatrien and their diasteroisomers with hydrogen as the sole possible substituent attached to carbon atoms 17 and 21 and isopropenyl acetate in the presence of a catalytic amount of a sulfonic acid, whereby the corresponding 20:21 enol acetate and acetone are formed as reaction products, while continuously distilling from the reaction zone the acetone as formed.

3. A method for the conversion of a 20-keto-allopregnan, having hydrogen as the sole substituent attached to carbon atoms 17 and 21 of the pregnan carbon skeleton, to its 20:21 enol acetate comprising heating under reflux a 20-ketoallopregnan with hydrogen as the sole substituent attached to carbon atoms 17 and 21 of the pregnan carbon skeleton and isopropenyl acetate in the presence of a catalytic amount of a sulfonic acid, whereby a 20-acetoxy 20:21 allopregnen and acetone are formed as reaction products, while continuously distilling from the reaction zone the acetone as formed.

4. A method for the preparation of 3-beta-20-diacetoxy-allo-20-pregnen comprising heating under reflux 3-beta-acetoxy-allopregnan-20-one and isopropenyl acetate in the presence of a catalytic amount of p-toluenesulfonic acid, whereby 3-beta-20-diacetoxy-allo-20-pregnen and acetone are formed as reaction products, while continuously distilling from the reaction zone the acetone as formed and isolating the 3-beta-20-diacetoxy-allo-20-pregnen from the reaction mixture.

5. A method for the conversion of a 20-keto-pregnen, having hydrogen as the sole possible substituent attached to carbon atoms 17 and 21 of the pregnen carbon skeleton, to its 20:21 enol acetate comprising heating under reflux a 20-ketopregnen, with hydrogen as the sole possible substituent attached to carbon atoms 17 and 21 of the pregnen carbon skeleton, and isopropenyl acetate in the presence of a catalytic amount of a sulfonic acid, whereby a 20-acetoxy-20:21-pregnadien and acetone are formed as reaction products, while continuously distilling from the reaction zone the acetone as formed.

6. A method for the preparation of 3-beta-20-diacetoxy-5,20-pregnadien comprising heating under reflux 3-beta-acetoxy-5-pregnen-20-one and isopropenyl acetate in the presence of a catalytic amount of p-toluene sulfonic acid, whereby 3-beta - 20 - diacetoxy-5,20-pregnadien and acetone are formed as reaction products, while continuously distilling from the reaction zone the acetone as formed and isolating the 3-beta-20-diacetoxy-5,20-pregnadien from the reaction mixture.

7. A method for the preparation of 3-beta-20-diacetoxy - 9,11 - oxido-5,7,20-pregnatrien dimethyl maleate adduct comprising heating under reflux 3-beta-acetoxy-9,11-oxido-5,7-pregnadien-20-one dimethyl maleate adduct and isopropenyl acetate in the presence of a catalytic amount of p-toluene sulfonic acid, whereby 3-beta-20-diacetoxy - 9,11-oxido-5,7,20-pregnatrien dimethyl maleate adduct and acetone are formed as reaction products, while continuously distilling from the reaction zone the acetone as formed, and isolating the 3-beta-20-diacetoxy-9,11-oxido-5,7,20-pregnatrien dimethyl maleate adduct from the reaction mixture.

8. A method for the conversion of a 20-keto-pregnadien, having hydrogen as the sole possible substituent attached to carbon atoms 17 and 21 of the pregnadien carbon skeleton, to its 20:21 enol acetate comprising heating under reflux a 20-ketopregnadien, with hydrogen as the sole possible substituent attached to carbon atoms 17 and 21 of the pregnadien carbon skeleton, and isopropenyl acetate in the presence of a catalytic amount of a sulfonic acid, whereby a 20-acetoxy-20:21-pregnatrien and acetone are formed as reaction products, while continuously distilling from the reaction zone the acetone as formed.

9. A method for the preparation of 3-beta-20-diacetoxy-5,16,20-pregnatrien comprising heating under reflux 3-beta-acetoxy-5,16-pregnadien-20-one and isopropenyl acetate in the presence of a catalytic amount of p-toluenesulfonic acid, whereby 3-beta-20-diacetoxy-5,16,20-pregnatrien acetone are formed as reaction products, while continuously distilling from the reaction zone the acetone as formed and isolating the 3-beta-20-diacetoxy-5,16,20-pregnatrien from the reaction mixture.

10. A method for the conversion of a 20-keto pregnatrien, having hydrogen as the sole possible substituent attached to carbon atoms 17 and 21 of the pregnatrien carbon skeleton, to a 20:21 enol acetate comprising heating under reflux a 20-ketopregnatrien, having hydrogen as the sole possible substituent attached to carbon atoms 17 and 21 of the pregnatrien carbon skeleton, and isopropenyl acetate in the presence of a catalytic amount of a sulfonic acid, whereby a 20-acetoxy-20:21 pregnatetraen and acetone are formed as reaction products, while continuously distilling from the reaction zone the acetone as formed.

11. A method for the preparation of 3-beta-20-diacetoxy-5,7,9:11,20:21-pregnatetraen comprising heating together under reflux 3-beta-acetoxy - 5,7,9:11-pregnatrien-20-one and isopropenyl acetate in the presence of a catalytic amount of p-toluenesulfonic acid, whereby 3-beta - 20-diacetoxy-5,7,9:11,20:21-pregnatetraen and acetone are formed as reaction products, while distilling from the reaction zone the acetone as formed and isolating the 3-beta-20-diacetoxy-5,7,9:11,20:21-pregnatetraen from the reaction mixture.

12. A member of the group consisting of 3,20 - diacetoxypregnatrienes, 3,20 - diacetoxy-5,7,9:11,20:21 - pregnatetraens and their 5:8 maleic anhydride and 5:8-dimethyl maleate adducts characterized by the presence of a 20:21 carbon-carbon double bond.

13. 3(beta),20 - diacetoxy - 9,11,oxido-5,7,20-pregnatrien-5:8-dimethyl maleate adduct.

14. 3(beta),20 - diacetoxy-5,16,20-pregnatrien.

15. 3(beta),20 - diacetoxy-5,7,9:11,20:21-pregnatetraen.

16. 3(beta),20 - diacetoxy-5,7,9:11,20:21-pregnatetraen-5:8-dimethyl maleate adduct.

17. 3,20-diacetoxy-3,5,20-pregnatrien.

ROBERT BRUCE MOFFETT.

No references cited.